United States Patent [19]
Hernandez et al.

[11] Patent Number: 5,590,023
[45] Date of Patent: Dec. 31, 1996

[54] COMPUTER APPARATUS FOR SUSPENSION OF COMPUTER EXPANSION CARDS

[76] Inventors: Gilberto Hernandez, 16707 Simsbrook Dr.; Russell C. Smith, P.O. Box 1156, both of Pflugerville, Tex. 78691; Daniel Bouvier, 7101 Figvine Cove, Austin, Tex. 78750

[21] Appl. No.: 507,619

[22] Filed: Jul. 26, 1995

[51] Int. Cl.⁶ .............................. G06F 1/16; H05K 7/04; H05K 7/10; H01R 13/74
[52] U.S. Cl. .......................... 361/683; 361/686; 361/807; 361/825; 439/545
[58] Field of Search .......................... 364/708.1; 439/64, 439/76.1, 347, 351, 353, 354, 501, 540.1, 544, 545, 562, 563, 928.1, 929, 929.1; 361/683, 686, 732, 733, 740, 741, 756, 759, 801, 802, 803, 807, 809, 825

[56] References Cited

U.S. PATENT DOCUMENTS

| | | | |
|---|---|---|---|
| 5,136,468 | 8/1992 | Wong et al. | 361/683 |
| 5,495,389 | 2/1996 | Dewitt et al. | 361/683 |
| 5,519,572 | 5/1996 | Luo | 361/683 X |

*Primary Examiner*—Michael W. Phillips
*Attorney, Agent, or Firm*—Haynes and Boone, L.L.P.

[57] ABSTRACT

An apparatus for the suspension of computer expansion cards away from a system planar in a computer chassis. The apparatus includes a card, an interface plate secured to the card, the interface plate having an opening, and a hanger extending from the chassis such that the hanger engages the interface plate through the opening to support the card away from the planar when the card is disconnected from the planar. The opening in the interface plate may have a first portion and a second portion, where the hanger engages the interface plate through the first portion of the opening and secures the interface plate to the chassis when the card is connected to the planar, and the hanger engages the interface plate through the second portion of the opening to support the card away from the planar when the card is disconnected from the planar. Alternatively, the interface plate may be omitted with the opening being placed in the expansion card.

16 Claims, 4 Drawing Sheets

5,590,023

COMPUTER APPARATUS FOR SUSPENSION OF COMPUTER EXPANSION CARDS

TECHNICAL FIELD

The invention relates generally to personal computer expansion cards and, more specifically, to an apparatus for the suspension of expansion cards away from a circuit board.

BACKGROUND OF THE INVENTION

Personal computers utilize circuit carrying boards housed in a chassis as platforms to secure and interconnect individual electronic components. In order to provide consumer flexibility, these circuit boards, sometimes called system planars, are frequently designed to accommodate additional circuit boards, or expansion cards, to provide additional and/or alternative functionality. For example, many personal computer system planars are designed with expansion card slots for standard bus interfaces, such as ISA (Industry Standard Architecture) and EISA (Extended Industry Standard Architecture), into which expansion cards for peripheral devices, such as hard disk controllers, tape controllers, modems and other I/O controllers, may be connected. Many of these expansion cards require connections to devices and equipment external to the computer chassis itself. Accordingly, access openings in the computer chassis, generally located at the back of the chassis and adjacent to the expansion card connectors, are provided to allow for connection between the expansion cards and peripheral devices.

The connection between expansion cards and peripheral devices is accomplished by providing a connector on the expansion card into which a cable, associated with a peripheral device, is electrically connected. Typically, the connector has a female connection into which the cable, having a male connector, is inserted. The connection is maintained by a friction-fit between the male and female connectors. However, some friction-fit connections may become inadvertently disconnected which can cause catastrophic failures in the computer system. In order to protect against such inadvertent disconnections, many cables are semi-permanently secured to the connector by a screw or other mechanism.

An ongoing attempt has been made within the computer industry to provide quick and efficient maintenance of computer components. One difficulty encountered in accessing and maintaining system planars into which expansion cards have been connected is the necessity of removing the expansion cards from the system planar prior to removing the system planar from the computer chassis. This problem is compounded when an expansion card is connected to a peripheral device by means of a cable, particularly where the connection is secured by a screw or other mechanism. In this circumstance, all of the cabling must be disconnected from the expansion card prior to removing the expansion card from the system planar. Further, most cabling is placed at the rear of a computer chassis which is generally difficult to access, thereby compounding the problems associated with quickly accessing the system planar.

As a consequence, what is needed is an apparatus which permits externally connected expansion cards to remain within the computer chassis while the system planar is removed from the chassis.

SUMMARY OF THE INVENTION

The expansion card suspension apparatus of the present invention avoids and overcomes the above-mentioned disadvantages and drawbacks characteristic of the prior art.

According to the present invention and in a departure from the prior art, the suspension apparatus consists of an expansion card attached to an interface plate, the interface plate having at least one opening, and a hanger extending from the chassis such that the hanger engages the interface plate through the opening to support the card away from the planar when the card is disconnected from the planar.

In another embodiment of the invention, the interface plate is configured so that the opening has a first portion and a second portion and the hanger engages the interface plate through the first portion of the opening to secure the interface plate to the chassis when the card is connected to the planar, and through the second portion of the opening to support the card away from the planar when the card is disconnected from the planar.

In another embodiment of the invention the interface plate is omitted and the expansion card has at least one opening through which the hanger engages the expansion card.

The invention results in several technical advantages. Generally, the invention allows a card to be suspended away from the system planar to allow quick and efficient access to the system planar for maintenance, particularly when the card is attached to a peripheral device external to computer chassis.

DESCRIPTION OF THE PREFERRED EMBODIMENT

Figure 1:
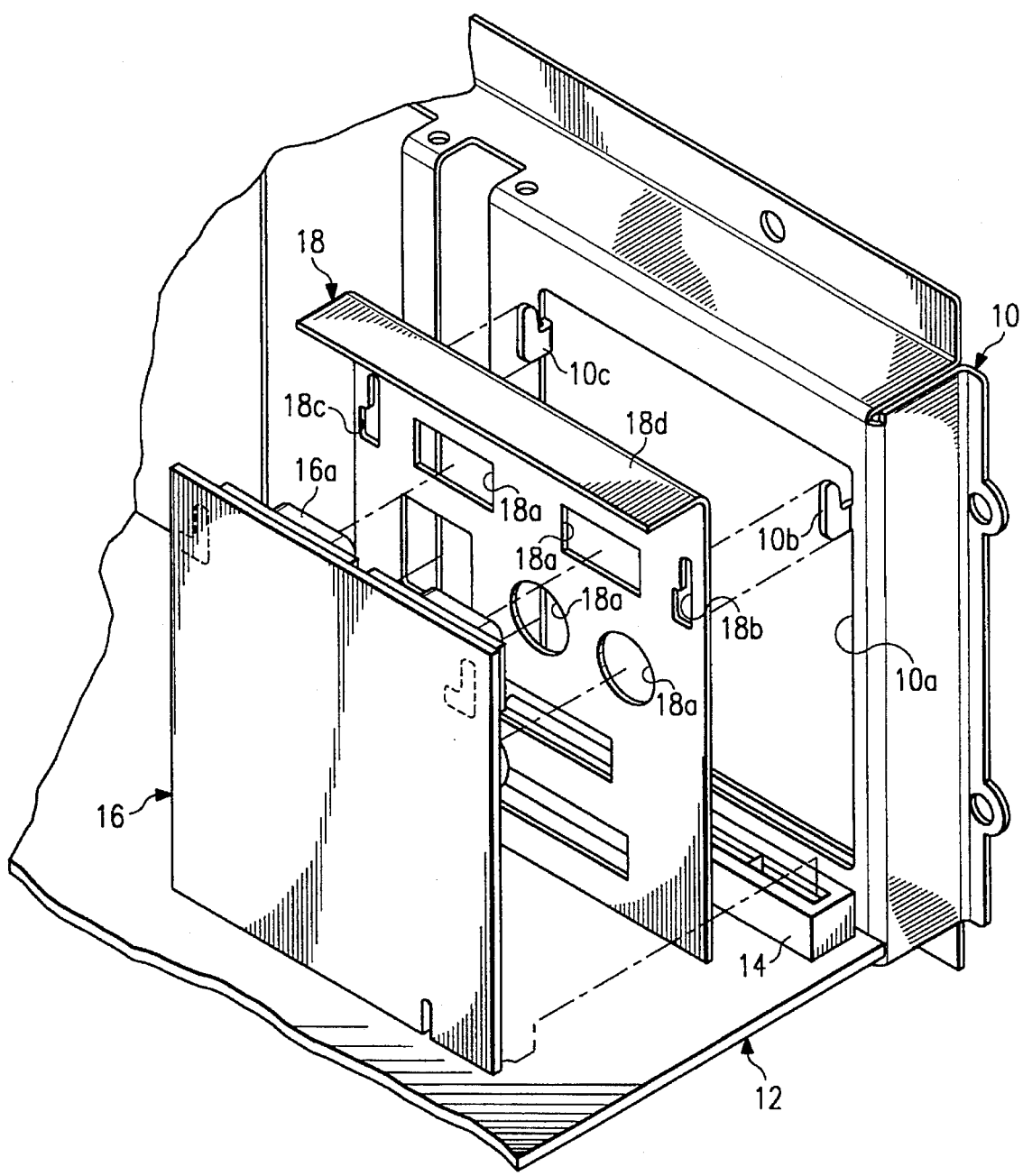
FIG. 1 is an exploded view of the expansion card suspension apparatus of the present invention.

In FIG. 1 the reference numeral 10 refers, in general, to a rear wall portion of a computer chassis. The wall portion 10 extends vertically as viewed in FIG. 1 and has a rectangular access opening 10a formed therethrough, for reasons to be described. A pair of spaced hangers 10b and 10c extend from the inner surface of the wall portion 10 and to the respective sides of the opening 10a for reasons to be described.

A horizontally extending system planar, or board, 12 is located, along one edge portion, adjacent to the lower edge portion of the wall portion 10. Although not shown in FIG. 1, it is understood that the computer chassis includes a floor which extends immediately below the system planar 12, and to which the system planar 12 is connected in any known manner.

A female edge connector 14 is disposed on the upper surface of the system planar 12 adjacent the wall portion 10 and is secured to the planar 12 in any known manner. The edge connector 14 is adapted to receive the lower end portion of an expansion card 16, it being understood that cooperating male and female electrical terminals are provided in the connector and on the end portion of the card, respectively, to complete a series of electrical connections when the card is inserted into the connector, in a conventional manner. As better shown in FIG. 2, a plurality of peripheral connectors 16a project from the rear surface of the card 16 for receiving corresponding connectors from external devices, as will be described. Two openings in the card 16 are shown in phantom (in FIG. 1) which provide for an alternative embodiment of the invention, as will be described.

Figure 2:
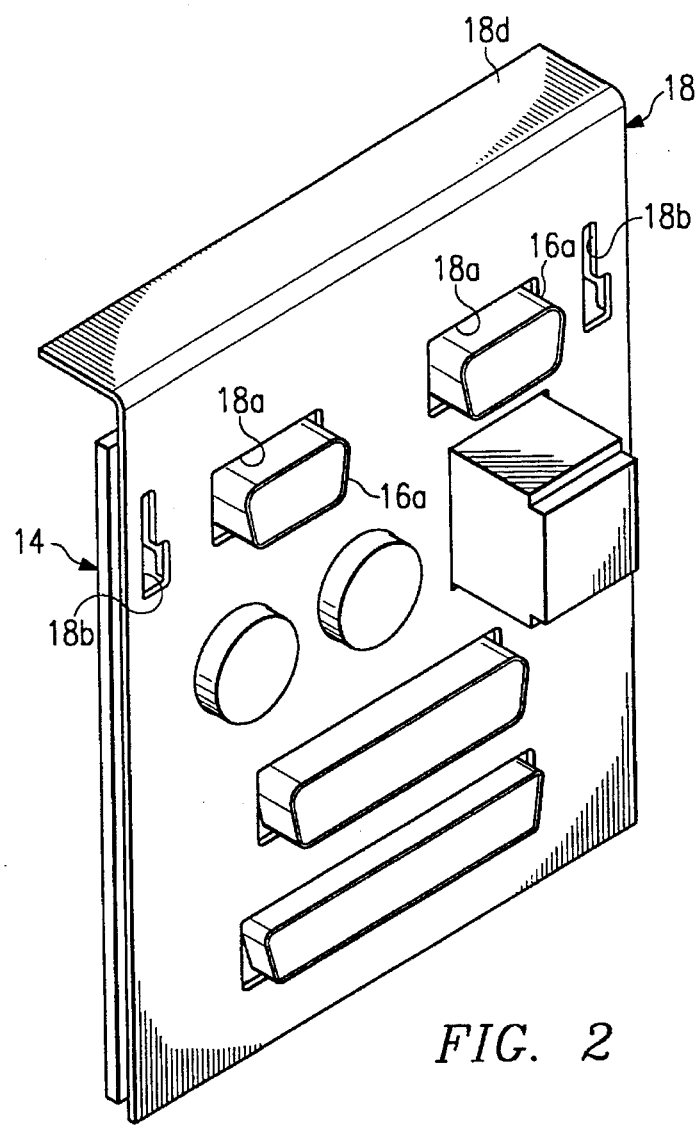
FIG. 2 is a rear perspective view of the expansion card shown in FIG. 1.

Referring to FIG. 1, an interface plate 18 extends between the connector 14 and the inner surface of the wall portion 10. The plate 18 is rectangular and has a height and width slightly greater than the height and width, respectively, of the access opening 10a of the wall portion 10 so as to cover the opening. A plurality of apertures 18a are formed through the plate 18 for receiving the projecting connectors 16a of the card 16, as shown in FIG. 2. Two spaced, substantially L-shaped, openings 18b and 18c are also formed through the plate 18 for receiving the hangers 10b and 10c. Additionally, a handle 18d is formed by a portion of the plate 18 to assist in the operation of the apparatus, as will be described.

Figure 3:
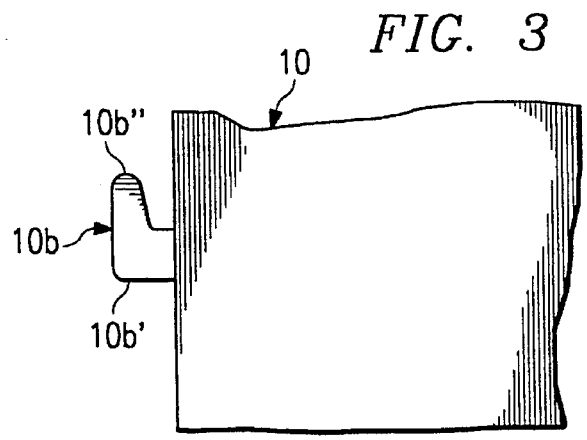
FIG. 3 is a side perspective view of a hanger shown in FIG. 1.

In FIG. 3 the hanger 10b extends from the inner surface of the wall portion 10. The hanger 10b, is comprised of a substantially horizontal portion 10b' and substantially vertical portion 10b". The vertical portion 10b" of the hanger 10b is slanted away from the inner surface of the wall portion 10. It is understood that the hanger 10c, not shown, is identical to the hanger 10b, and is comprised of a substantially horizontal portion 10c' and substantially vertical portion 10c".

Figure 4:
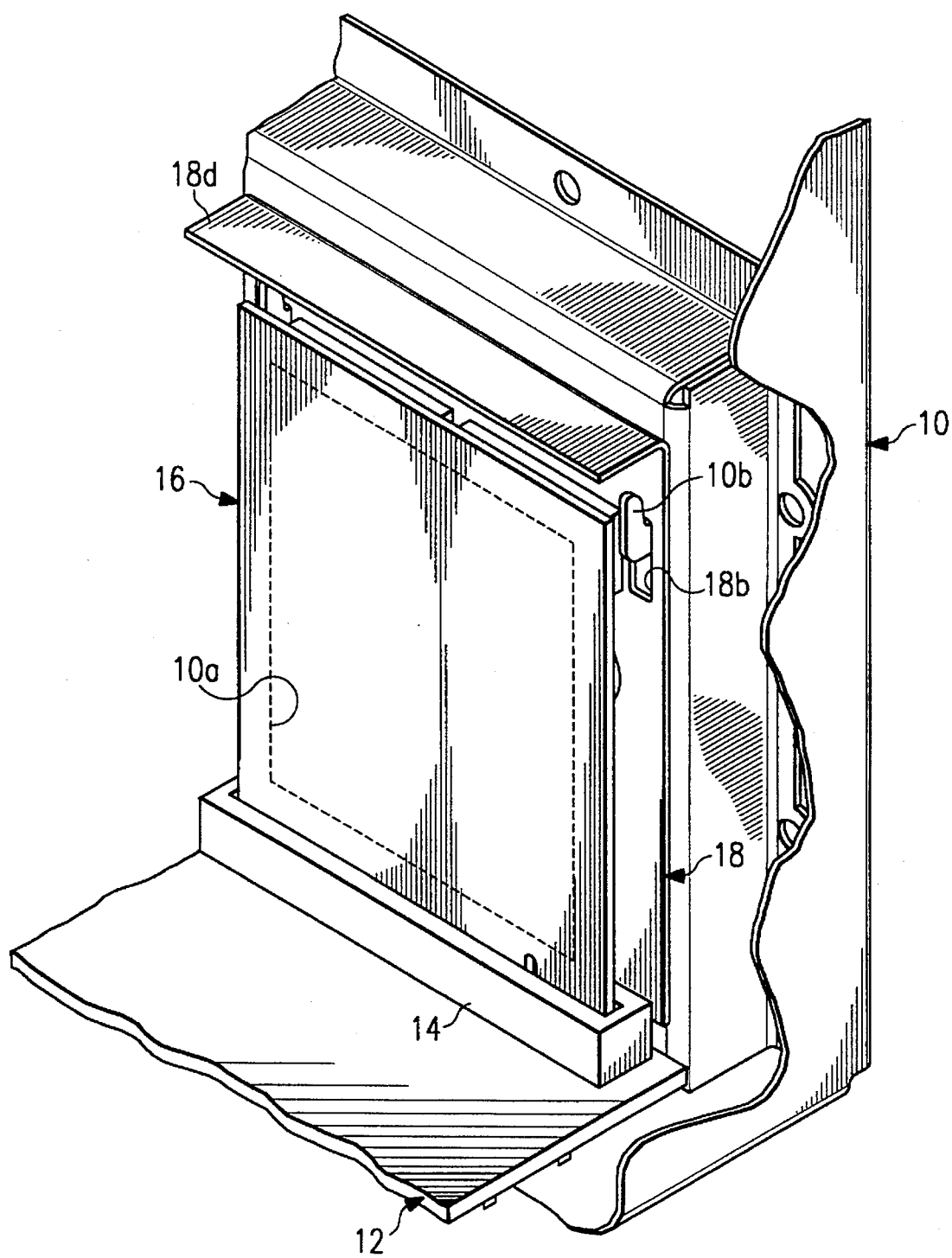
FIG. 4 is a perspective view of the expansion card suspension apparatus shown in FIG. 1 with the expansion card inserted into the system planar.

In FIG. 4 the components shown in FIGS. 1 and 2 are shown in an assembled condition with the card 16 inserted into the connector 14 on the system planar 12. The interface plate 18 is also secured to the inner surface of the wall portion 10 by the hangers 10b and 10c extending through the elongated vertical portion (in the perspective shown) of the openings 18b and 18c, respectively.

Figure 5:
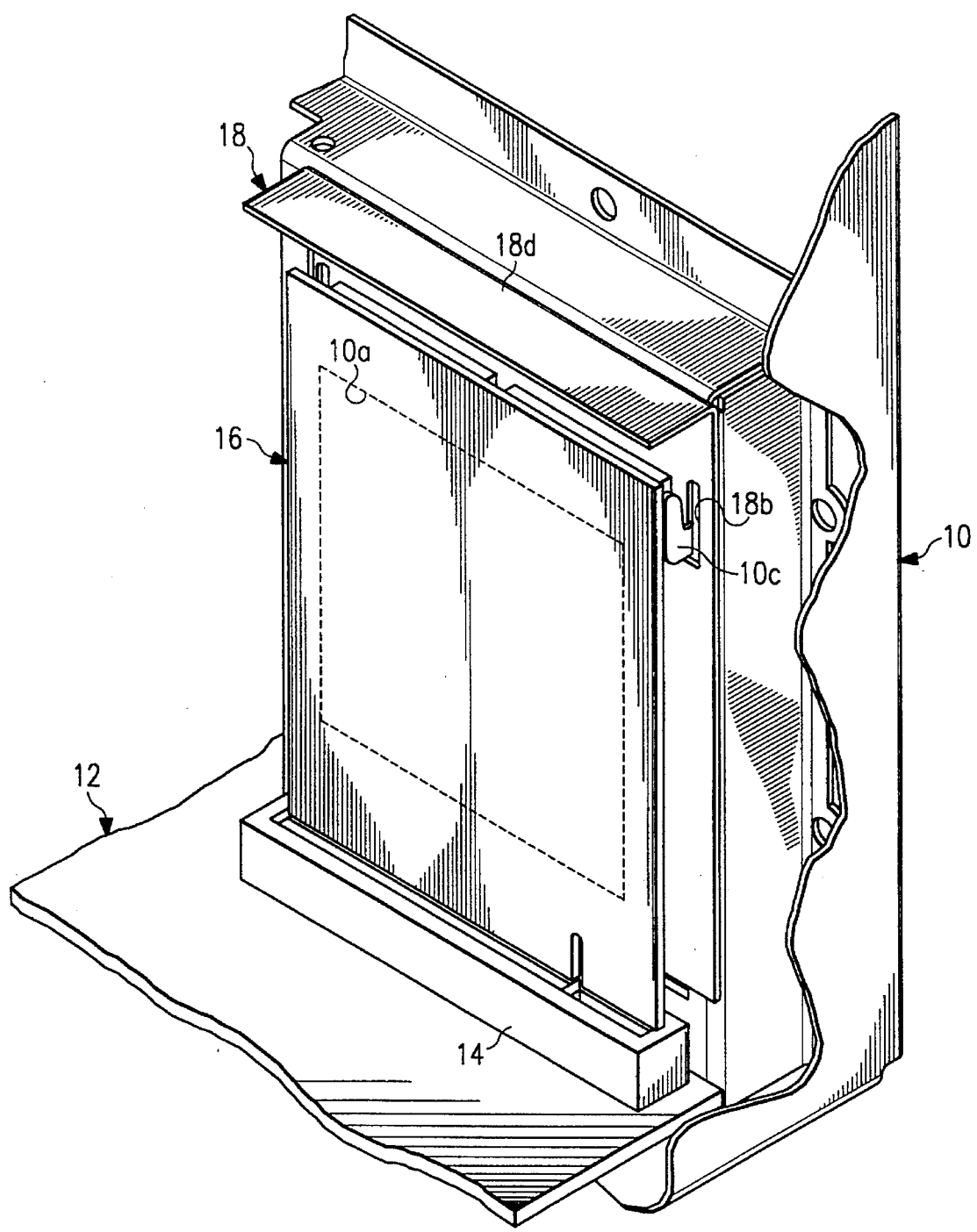
FIG. 5 is a perspective view of the expansion card suspension apparatus shown in FIG. 1 with the expansion card suspended above the system planar.

In FIG. 5 the components shown in FIGS. 1 and 2 are shown in an assembled condition but with the card 16 removed from the connector 14 and suspended above the system planar 12. The interface plate 18 is secured to the inner surface of the wall portion 10 by the hangers 10b and 10c extending through the horizontal portion (in the perspective shown) of the openings 18b and 18c, respectively, to suspend the card 16 above the system planar 12.

Operation of the suspension apparatus will now be described. As shown in FIG. 4, the interface plate 18 is secured to the card 16, by screws, fasteners, adhesives, or any other appropriate method, such that the connectors 16a pass through corresponding apertures 18a in the interface plate 18. After the interface plate 18 is secured to the card 16, the handle 18d is grasped and the hangers 10b and 10c on the wall portion 10 are inserted into the vertical portion of the openings 18b and 18c, in the interface plate 18 as shown in FIG. 4. The interface plate 18 and the attached card 16 are then moved vertically down (in the orientation illustrated in FIG. 4) until the hangers 10b, 10c engage the top of the openings 18b, 18c and the lower portion of the expansion card 16 is inserted into connector 14. The hangers 10b, 10c contain vertical portions 10b" and 10c" which are slanted away from the inner surface of the wall portion 10 such that as the interface plate 18 is moved vertically down over the hangers 10b and 10c the interface plate 18 is drawn toward the inner surface of the wall portion 10 to seal the access opening 10a. By sealing the access opening 10a the interface plate 18 provides insulation against electromagnetic radiation and noise, as well as protection against dirt and dust invasion. Accordingly, the card 16 is secured to the system planar 12 by the female connector 14, and the interface plate 18 is secured to the wall portion 10 by the hangers 10b and 10c. The card 16 may then be connected by means of cabling to peripheral devices by connectors 16a through access opening 10a.

The card 16 may be similarly removed from the computer chassis by a reverse operation. The card 16 is first disconnected from any peripheral devices. Then the interface plate 18 and associated card 16 are moved vertically up (in the orientation illustrated in FIG. 4), by means of the handle 18d, to disconnect the card 16 from the female connector 14. As the interface plate 18 is lifted the interface plate 18 slides relative to hangers 10b, 10c and away from the wall portion 10. The interface plate 18 may then be moved so that the hangers 10b, 10c are removed from the openings 18b, 18c and the plate 18 and its associated card 16 can be removed from the computer chassis.

In the event the card 16 is connected to peripheral devices, the suspension apparatus allows the system planar 12 to be quickly and easily removed from the computer chassis for maintenance without requiring the disconnection of cables attached to the card 16. As shown in FIG. 5, the card 16 has been removed from female connector 14 by lifting the card 16 away from system planar 12 and out of female connector 14. Removal of the card 16 from the connector 14 is generally accomplished by grasping handle 18d and lifting interface plate 18 and associated card 16 vertically up (in the orientation illustrated in FIG. 4) relative to the system planar 12. At this point it is understood that the peripheral device cabling is still connected to the card 16 by connectors 16a through access opening 10a as discussed above. Interface plate 18 is then moved laterally right (in the orientation illustrated in FIG. 4) such that the hangers 10b, 10c (10c not shown in this perspective) rest on the horizontal portion of openings 18b, 18c (18c not shown in this perspective). Interface plate 18 and associated card 16 are accordingly suspended above the system planar 12, as viewed in FIG. 4, by the hangers 10a, 10b engaging the horizontal portion of openings 18b, 18c in the interface plate 18. With the card 16 and interface plate 18 suspended above the system planar 12, the system planar 12 may be easily slid underneath the card 16 and removed from the computer chassis on the chassis floor. Therefore the system planar 12 may be quickly and easily removed from the computer chassis for maintenance without requiring the disconnection of cables attached to the card 16.

Once the system planar 12 has been serviced, it is then slid under the still suspended card 16. The card 16 is then moved laterally left (in the orientation illustrated in FIG. 4) such that the hangers 10b, 10c are within the vertical portion of openings 18b, 18c. The interface plate 18 and associated card 16 are then moved vertically down such the lower edge portion of the card 16 is inserted into the female connector 14 and the hangers 10b, 10c draw the interface plate 18 toward the inner portion of wall 10 to seal the access opening 10a, as shown in FIG. 4.

Several technical advantages result from the foregoing. Because the card 16 is suspended away from planar 12 by means of the hangers 10b, 10c and the openings 18b, 18c, the planar 12 is easily removed from the computer chassis without requiring access to and disconnection of cables attached to the connectors 16a. Further, utilizing the hangers 10b, 10c to secure the interface plate 18 over the access opening 10a when the card 16 is inserted into the connector 18a provides protection from electromagnetic radiation, noise, dirt and dust invasion through access opening 10a.

Although an illustrative embodiment of the invention has been shown and described, other modifications, changes, and substitutions are intended in the foregoing disclosure. For example, the openings 18b, 18c could be incorporated into card 16, as shown in phantom in FIG. 1, for connection to the chassis 12. Accordingly, the interface card 18 need not be required. Any number of openings 18b, 18c may be used with a corresponding numbers of hangers 10b, 10c. Any hanger design which permits the card 16 to be suspended away from system planer 12 while connected to cables by connectors 16a, and which permit planer 12 to be removed from the computer chassis can be utilized. Further, the opening need not be L-shaped, but could have any design that permits the card 16 to be suspended away from the system planar 12.

Accordingly, it is appropriate that the appended claims be construed broadly and in a manner consistent with the scope of the invention.

What is claimed is:

1. Computer apparatus comprising:
   an expansion card for suspension in a computer chassis relative to a planar, said planar having a connector for connecting to said card;
   a hanger extending from said chassis; and
   an interface plate secured to said card and having an opening therein such that said hanger extends through said opening when said card is connected to said connector and said hangerengages said interface plate through said opening to support said card away from said planar when said card is disconnected from said connector.

2. The computer apparatus of claim 1 wherein said planar may be removed from said chassis while said card is supposed away from said planar.

3. The computer apparatus of claim 1, further comprising a second hanger extending from said chassis and a second opening in said interface plate such that said second hanger engages said interface plate through said second opening to support said card away from said planar when said card is disconnected from said connector.

4. The computer apparatus of claim 1, wherein said connector is a female edge connector and said card has an edge portion which is a male edge connector for connecting to said female edge connector.

5. The computer apparatus of claim 1, wherein said card is an input-output card.

6. The computer apparatus of claim 1, wherein said card is attached to at least one peripheral device.

7. The computer apparatus of claim 6, wherein said card may be supported away from said planar without detaching said at least one peripheral device.

8. Computer apparatus comprising:
   an expansion card for suspension in a computer chassis relative to a planar, said planar having a connector for connecting to said card;
   a hanger extending from said chassis; and
   an interface plate secured to said card having an opening therein, said opening having a first portion and a second portion, such that said hanger engages said plate through said first portion of said opening and secures said plate to said chassis when said card is connected to said connector, and said hanger engages said plate through said second portion of said opening to support said card away from said planar when said card is disconnected from said connector.

9. The computer apparatus of claim 8, wherein said planar may be removed from said chassis while said card is supported away from said planar.

10. The computer apparatus of claim 8, wherein said hanger is slanted away from said chassis such that as said hanger engages said plate through said opening said plate is drawn toward said chassis.

11. The computer apparatus of claim 8, further comprising a second hanger extending from said chassis and a second opening in said plate, said second opening having a first portion and a second portion, such that said second hanger engages said plate through said first portion of said second opening and secures said plate to said chassis when said card is connected to said connector, and said second hanger engages said plate through said second portion of said second opening to support said card away from said planar when said card is disconnected from said connector.

12. The computer apparatus of claim 8, wherein said connector is a female edge connector and said card has an edge portion which is a male edge connector for connecting to said female edge connector.

13. The computer apparatus of claim 8, wherein said card is an input-output card.

14. The computer apparatus of claim 8, wherein said interface card has an aperture through which a peripheral device is connected to said card.

15. The computer apparatus of claim 14, wherein said card may be supported away from said planar without detaching said peripheral device.

16. Computer apparatus comprising;
   an expansion card for suspension in a computer chassis relative to a planar, said planar having a connector for connecting to said card;
   a means for hanging said card attached to said chassis; and
   a means for receiving said hanging means whereto said hanging means secures said card to said chassis when said card is connected to said connector, and said hanging means supports said card away from said planar when said card is disconnected from said connector.

* * * * *

UNITED STATES PATENT AND TRADEMARK OFFICE
CERTIFICATE OF CORRECTION

PATENT NO. : 5,590,023
DATED : December 31, 1996
INVENTOR(S) : Hernandez et al.

It is certified that error appears in the above-identified patent and that said Letters Patent is hereby corrected as shown below:

<u>Title page,</u>
Item [73], Assignee, please insert -- Dell USA, L.P., Austin, Texas --.

Signed and Sealed this

Twenty-eighth Day of October, 2003

JAMES E. ROGAN
*Director of the United States Patent and Trademark Office*